United States Patent
Toda

(10) Patent No.: US 11,137,494 B2
(45) Date of Patent: Oct. 5, 2021

(54) DISTANCE-DETECTION SYSTEM FOR DETERMINING A TIME-OF-FLIGHT MEASUREMENT AND HAVING A REDUCED DEAD ZONE

(71) Applicant: TE CONNECTIVITY CORPORATION, Berwyn, PA (US)

(72) Inventor: Minoru Toda, Lawrenceville, NJ (US)

(73) Assignee: TE CONNECTIVITY SERVICES GMBH, Schaffhausen (CH)

( * ) Notice: Subject to any disclaimer, the term of this patent is extended or adjusted under 35 U.S.C. 154(b) by 553 days.

(21) Appl. No.: 16/207,898

(22) Filed: Dec. 3, 2018

(65) Prior Publication Data

US 2020/0174116 A1 Jun. 4, 2020

(51) Int. Cl.
G01S 15/00 (2020.01)
G01S 15/10 (2006.01)
G01S 7/527 (2006.01)

(52) U.S. Cl.
CPC .......... G01S 15/101 (2013.01); G01S 7/5276 (2013.01)

(58) Field of Classification Search
USPC ........................................................ 367/99
See application file for complete search history.

(56) References Cited

U.S. PATENT DOCUMENTS

| | | | |
|---|---|---|---|
| 4,606,015 A | 8/1986 | Yamaguchi | |
| 5,442,592 A | 8/1995 | Toda et al. | |
| 5,483,501 A | 1/1996 | Park et al. | |
| 5,515,341 A | 5/1996 | Toda et al. | |
| 6,731,569 B2 | 5/2004 | Yurchenko et al. | |
| 6,981,417 B1 * | 1/2006 | Oravecz | G01N 29/0609 73/612 |
| 7,004,031 B2 | 2/2006 | Oda et al. | |
| 10,005,105 B2 * | 6/2018 | Takahata | G01S 7/524 |
| 2001/0012238 A1 | 8/2001 | Iwasaki et al. | |
| 2011/0026365 A1 | 2/2011 | Beckhoven et al. | |
| 2012/0143058 A1 * | 6/2012 | Powers | G01S 7/52077 600/443 |
| 2013/0235700 A1 * | 9/2013 | Koudar | G01S 7/52026 367/99 |

(Continued)

OTHER PUBLICATIONS

Carullo et al. "An Ultrasonic Sensor for Distance MEasurement in Automotive Applications" IEEE Sensors Journal; vol. 1, No. 2; 2001 (5 pages).

*Primary Examiner* — James R Hulka

(57) ABSTRACT

Distance-detection system includes a signal-generator configured to provide a drive signal and an ultrasound transducer having at least one ultrasonic element. The ultrasound transducer is configured to transmit a pulse of sound waves and detect reflected sound waves. The distance-detection system also includes a receiver configured to receive a detection signal from the ultrasound transducer. The detection signal includes a reverberation component representing reverberation of the ultrasound transducer and a reflected component representing reflected sound waves from the interface. The receiver is configured to receive a drive-cancellation signal that is inverted with respect to the reverberation component of the detection signal. The receiver is configured to determine a time-of-flight measurement based on the detection signal in which the reverberation component of the detection signal is reduced by the drive-cancellation signal.

20 Claims, 8 Drawing Sheets

(56) References Cited

U.S. PATENT DOCUMENTS

| | | | |
|---|---|---|---|
| 2015/0063073 A1* | 3/2015 | Takahata | B06B 1/0207 |
| | | | 367/137 |
| 2015/0292879 A1* | 10/2015 | Zhou | G01B 17/00 |
| | | | 73/631 |
| 2016/0076882 A1* | 3/2016 | Zhou | G01S 7/527 |
| | | | 73/631 |
| 2016/0284967 A1 | 9/2016 | Kruicken et al. | |
| 2018/0067207 A1* | 3/2018 | Bang | G01S 15/102 |
| 2018/0160226 A1* | 6/2018 | Hustava | G01S 7/52 |
| 2019/0196010 A1* | 6/2019 | Sugae | G01S 15/104 |
| 2019/0391783 A1* | 12/2019 | Moore | H04R 29/002 |
| 2019/0394569 A1* | 12/2019 | Moore | H04R 29/005 |
| 2019/0394601 A1* | 12/2019 | Moore | H04S 7/301 |
| 2020/0174116 A1* | 6/2020 | Toda | G01S 7/5276 |

* cited by examiner

DISTANCE-DETECTION SYSTEM FOR DETERMINING A TIME-OF-FLIGHT MEASUREMENT AND HAVING A REDUCED DEAD ZONE

BACKGROUND

The subject matter relates generally to distance-detection systems that use transducers to determine the distance between an interface and the transducer.

More and more machines are being designed with sensor that detect the distance between an object and a detectable boundary. For example, vehicles use proximity sensors to determine whether an obstruction exists within the path of the vehicle and warn the operator when an obstruction is identified. These proximity sensors may also be used to automatically control the vehicle, such as in crash-avoidance. One type of proximity sensor includes an ultrasound transducer. The ultrasound transducer generates sound waves in response to a designated drive signal. The sound waves may be intermittent pulses or a continuous transmission. The sound waves are reflected at a boundary where there is an impedance mismatch. For example, the sound waves can be reflected by a gas-liquid interface, a gas-solid interface, or a gas-liquid interface. The reflected sound waves are detected by the ultrasound transducer. The duration for the sound waves to travel from the ultrasound transducer and back may be referred to as the "time-of-flight" (TOF). The TOF value is used to calculate the distance traveled by the sound waves, and the distance between the ultrasound transducer and the boundary.

An ultrasound transducer may use one or more ultrasonic elements (e.g., piezoelectric element) for transmitting sound waves (herein referred to as "pulse waves") and for detecting the reflected sound waves (herein referred to as "reflected waves" or "echo"). In some ultrasound transducers, the same ultrasonic element may operate in different modes to transmit pulses waves and to detect (or receive) reflected waves. Although the above ultrasound transducers can accurately estimate certain distance ranges, it can be challenging to detect shorter distances. For example, it can be difficult to calculate distances when the pulse waves are reflected by an interface that is less than fifteen (15) millimeters away from the ultrasonic element.

More specifically, it can be difficult to calculate distances as the ultrasonic element is responding to a drive signal and even after the drive signal has ceased. The drive signal is the electrical signal that excites the transducer. While responding to the drive signal, the vibrations caused by the ultrasonic element generate sound waves. Even after the drive signal has ceased, the ultrasonic element continues to vibrate, thereby causing sound waves that are detected by the sensor. This phenomenon is referred to as "ringing" or "ring-down." As such, vibrations from the ultrasonic element itself may be detected prior to the reflected waves reaching the ultrasound transducer. The signal caused by the vibrations makes it difficult to determine whether any reflected waves have been received.

To address this issue, ultrasound transducers typically have a time window (referred to as a "dead zone") in which any detectable sound waves are not relied upon for calculating the distance. For example, an ultrasound transducer may only consider a detected sound wave 5.0 milliseconds after the drive signal has ceased. Reducing this window can require extensive transducer/circuit design changes and significantly added cost. Even if the ring-down period can be reduced, there is still a time during the drive signal in which detectable sound waves are not considered. As such, boundaries at certain short distances from the ultrasonic element may not be detected.

Accordingly, there is a need for a distance-detection system that is capable of detecting reflected sound waves as the ultrasonic element responds to the drive signal or during ring-down of the ultrasonic element.

BRIEF DESCRIPTION

In an embodiment, a distance-detection system is provided that includes a signal-generator configured to provide a drive signal and an ultrasound transducer having at least one ultrasonic element. The ultrasound transducer is configured to transmit a pulse of sound waves in response to the drive signal. The pulse is directed toward an interface. The ultrasound transducer is configured to detect reflected sound waves. The distance-detection system also includes a receiver configured to receive a detection signal from the ultrasound transducer. The detection signal includes a reverberation component representing reverberation of the ultrasound transducer and a reflected component representing reflected sound waves from the interface. The receiver is configured to receive a drive-cancellation signal that is inverted with respect to the reverberation component of the detection signal and wherein the receiver is configured to determine a time-of-flight measurement based on the detection signal in which the reverberation component of the detection signal is reduced by the drive-cancellation signal.

In some aspects, the distance-detection system also includes a signal inverter that is configured to generate an inverted drive signal based on the drive signal. The drive-cancellation signal is generated by a suppression module that is fed the inverted drive signal.

In some aspects, the receiver is configured to receive the detection signal as the pulse is transmitted toward the interface and determine the time-of-flight measurement of the reflected component that was received as the pulse was transmitted.

In some aspects, the distance-detection system also includes a switching circuit that is configured to switch between a transmit mode and a receive mode. The detection signal is received during the receive mode. The receive mode may occur without a dead zone.

In some aspects, the ultrasound transducer includes a first ultrasonic element, the pulse is a first pulse, and the detection signal is a first detection signal. The distance-detection system may also include a second ultrasonic element for directing a second pulse of sound waves toward the interface. The second pulse is transmitted in response to receiving an inverted drive signal. The receiver is configured to receive a second detection signal from the second ultrasonic element. The second detection signal includes the drive-cancellation signal.

In some aspects, the ultrasound transducer includes a first ultrasonic element, the pulse is a first pulse, and the detection signal is a first detection signal. The distance-detection system may also include a second ultrasonic element for directing a second pulse of sound waves toward the interface in response to the drive signal, wherein the first and second ultrasonic elements have opposite polarities. The receiver may also receive a second detection signal from the ultrasound transducer. The second detection signal may include the drive-cancellation signal.

In some aspects, the ultrasound transducer includes a first ultrasonic element, the pulse is a first pulse, and the detection signal is a first detection signal, the distance-detection system may also include a second ultrasonic element for directing a second pulse of sound waves toward the interface. The signal-generator is configured to provide an inverted drive signal to the second ultrasonic element. The first and second ultrasonic elements have opposite polarities. The receiver may be configured to receive a second detection signal from the ultrasound transducer, the second detection signal including the drive-cancellation signal.

In some aspects, the detection signal is a first detection signal. The distance-detection system may also include a dummy ultrasonic element configured to receive an inverted drive signal from the signal-generator. The receiver is configured to receive a second detection signal from the dummy ultrasound transducer. The second detection signal includes the drive-cancellation signal.

In some aspects, the distance-detection system also includes a resonant circuit configured to provide the drive-cancellation signal.

In some aspects, a resonant frequency of the at least one ultrasonic element is between 100 kHz and 10 MHz and the number of cycles in the pulse includes at least 3 cycles.

In an embodiment, a method is provided that includes providing a drive signal to an ultrasound transducer for transmitting a pulse of sound waves toward an interface. The method also includes receiving a detection signal from the ultrasound transducer, wherein the detection signal includes a reverberation component representing reverberation of the ultrasound transducer and a reflected component representing reflected sound waves from the interface. The method also includes receiving a drive-cancellation signal that is inverted with respect to the reverberation component of the detection signal and determining a time-of-flight measurement based on the detection signal in which the reverberation component is reduced by the drive-cancellation signal.

DETAILED DESCRIPTION

Embodiments set forth herein include distance-detection systems, ultrasound sensors, and methods for operating the same. The ultrasound sensors include a transducer that directs sound waves toward an interface, such as an liquid-air interface or an air-solid interface. The sound waves are reflected back toward the transducer. The transducer detects the reflected sound waves and communicates an electrical signal to electronic circuitry for processing the electrical signal. The electronic circuitry uses the electrical signal to determine useful information, such as a time-of-flight (TOF) measurement. The TOF measurement represents the time interval between when a pulse of sound waves are transmitted and when the reflected sound waves are detected. The TOF measurement may be used to determine a designated parameters, such as a distance between the ultrasound transducer and the interface. Embodiments set forth herein may be used to determine a distance between one object and another object (e.g., vehicle and an obstruction) or may be used to monitor a fluid level (e.g., within a tank) and/or identify a type or quality of the liquid.

Figure 1:
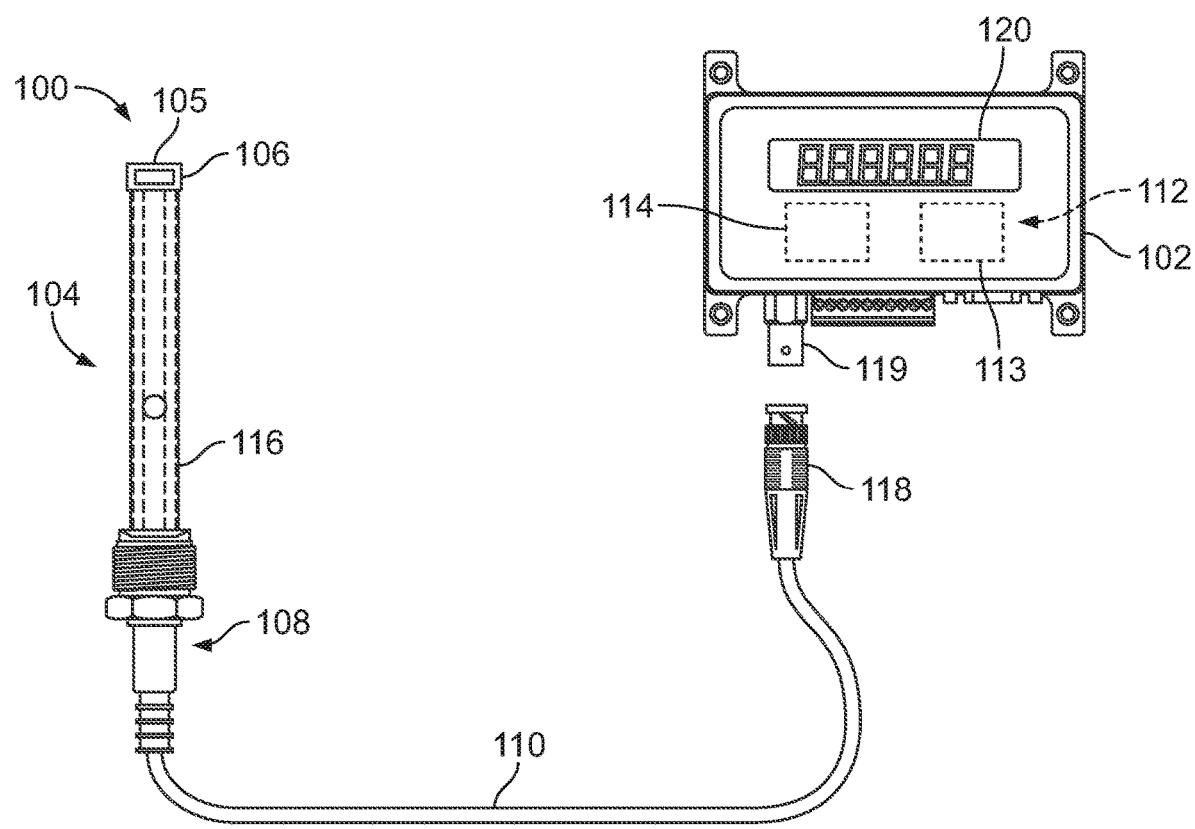
FIG. 1 illustrates a distance-detection system formed in accordance with an embodiment.

FIG. 1 illustrates a distance-detection system 100 formed in accordance with an embodiment. The distance-detection system 100 includes a control module 102, an ultrasound sensor 104, and a communication cable that 110 that communicatively couples the ultrasound sensor 104 and the control module 102. As such, the sensor 104 and the module 102 are wired to each other in the illustrated embodiment. In other embodiments, however, the sensor 104 and the module 102 may be communicatively coupled through a wireless standard (e.g., Bluetooth).

The sensor 104 includes an ultrasound transducer 106 having at least one ultrasonic element 105. In some embodiments, the ultrasonic elements are separate crystals. Embodiments having multiple ultrasonic elements may be configured to form a designated array transducer. For instance, the ultrasonic elements may be rectangular-shaped and located to form a designated array (e.g., linear or one-dimensional array). The ultrasonic elements may be square-shaped and located to form a designated array (e.g., two-dimensional array). The ultrasonic elements may be ring-shaped positioned concentrically to form an annular array. Optionally, embodiments may simultaneously transmit and receive. For example, one or more ultrasonic elements of the array may operate as a transmitter while one or more ultrasonic elements of the array operate as a receiver.

Alternatively or in addition to the above, a single crystal may be manufactured (e.g., dice-and-filled, micro-machined) to include discrete sections. These discrete sections may function as discrete ultrasonic elements. As such, a single crystal may be manufactured to provide an array transducer. Examples may include one-dimensional arrays, two-dimensional arrays, and annular arrays. Optionally, embodiments may simultaneously transmit and receive. For example, one or more ultrasonic elements of the array may operate as a transmitter while one or more ultrasonic elements of the array operate as a receiver.

The control module 102 is configured provide a drive signal to the sensor 104. For example, the control module 102 may include circuitry for generating an electrical drive signal that is communicated to the ultrasound transducer 106. The drive signal causes the ultrasonic element 105 to oscillate and generate a pulse of sound waves. The drive signal may have various forms and a range of frequencies. For example, the drive signal can include a sine wave or square-shaped pulses (e.g., unipolar, multi-level unipolar, bipolar). This drive signal may be inverted to produce a drive-cancellation signal as described herein.

The sound waves are reflected by an interface (e.g., boundary between liquid and gas) and a portion of the sound waves are reflected back toward the ultrasonic element 105. The reflected sound waves cause the ultrasonic element 105 to oscillate, thereby generating an electrical signal that is communicated to the control module 102. As the drive signal is applied, the oscillations of the ultrasonic element 105 contribute to the electrical signal and are communicated to the control module 102. After the drive signal ceases, the ultrasonic element 105 may continue to oscillate and these oscillations also contribute to the electrical signal that is communicated to the control module 102.

Accordingly, the detection signal received by the control module 102 includes a drive component, a reverberation component, and a reflected component. The drive component is primarily caused by the oscillations of the ultrasonic element 105 as the ultrasonic element 105 is activated by the drive signal. The reverberation component is primarily caused by the oscillations of the ultrasonic element 105 after the drive signal ceases to activate the ultrasonic element 105.

Also shown, the sensor 104 may include a fitting 108 and a sensor housing 116. The fitting 108 is configured to couple to a container or other apparatus (not shown) for positioning the transducer 106. The sensor housing 116 couples to and supports the transducer 106. The sensor housing 116 is elongated in the illustrated embodiment and may have any desired length based on the end-use application. The communication cable 110 may have a connector 118 at an opposite end that is configured to mechanically and electrically couple to a mating connector 119 of the control module 102.

The control module 102 includes electronic circuitry 112 for processing the detection signal to offset or suppress the reverberation component and remove false reflected echoes. For some applications, the detection signal may be affected by the temperature of the medium (or media) through which the sound waves travel. To this end, the control module 102 and/or the ultrasound sensor 104 may include one or more temperature sensors for determining a temperature of the surrounding environment (e.g., liquid and/or air). The electronic circuitry 112 may account for the temperature when determining a TOF measurement.

In the illustrated embodiment, the electronic circuitry 112 includes an analog front-end (AFE) module 114 and a processor 113. The AFE module 114 is configured to drive the ultrasound transducer 106 and convert the detection signal into digital signals that represent the beginning (START) and end (STOP) of the TOF measurement. The AFE module 114 or the processor 113 may process the detection signal to suppress the reverberation component. The processor 113 may control the AFE module 114, measure the time difference between the Start and Stop signals, and process the TOF measurement into a liquid level value. The liquid level value may then be communicated to a user through a display 120 of the control module 102 or through another form of communication (e.g., smartphone application).

In FIG. 1, the electronic circuitry 112 is illustrated as separate hardware components (AFE module 113 and processor 114). It should be understood, however, that the electronic circuitry 112 may be integrated into a single device or may have more than two electronic components. Moreover, the functions and/or operations described herein that are performed by the AFE module 113 or the processor 114 may be shared and/or performed by the other component or an additional electronic component.

Although not shown in FIG. 1, the electronic circuitry 112 may include, among other things, a signal-generator for generating a drive signal, an inversion circuit for inverting the drive signal, an addition circuit, and a receiver. In some embodiments, the electronic circuitry 112 may include a switching circuit for changing an operating mode of the ultrasound transducer 106, a matching circuit, and a resonant circuit.

Embodiments may reduce the time period (called "dead zone") in which any detectable sound waves are not relied upon for calculating the distance. This time period effectively translates to a distance from the ultrasound transducer in which reliable measurements cannot be made. By way of example, embodiments may reduce this dead zone in liquid-level applications from 25 mm to 2.5 mm. The size of the dead zone, however, may affect the performance of various ultrasonic devices. As such, embodiments may improve a variety of ultrasonic devices and applications.

Conversely, embodiments can enable the ultrasound transducer to be driven with higher amplitude and/or higher cycle numbers, thereby generating greater energy transfer. Greater energy transfer may improve penetration depth for some applications. For example, embodiments may be suitable for military air-range sensors.

In addition to distance-detection systems (e.g., liquid-level monitoring systems), it is contemplated that embodiments may be utilized in densitometry systems, which measure an optical density in light-sensitive materials. Embodiments may enable densitometry systems with smaller footprints.

Figure 2:
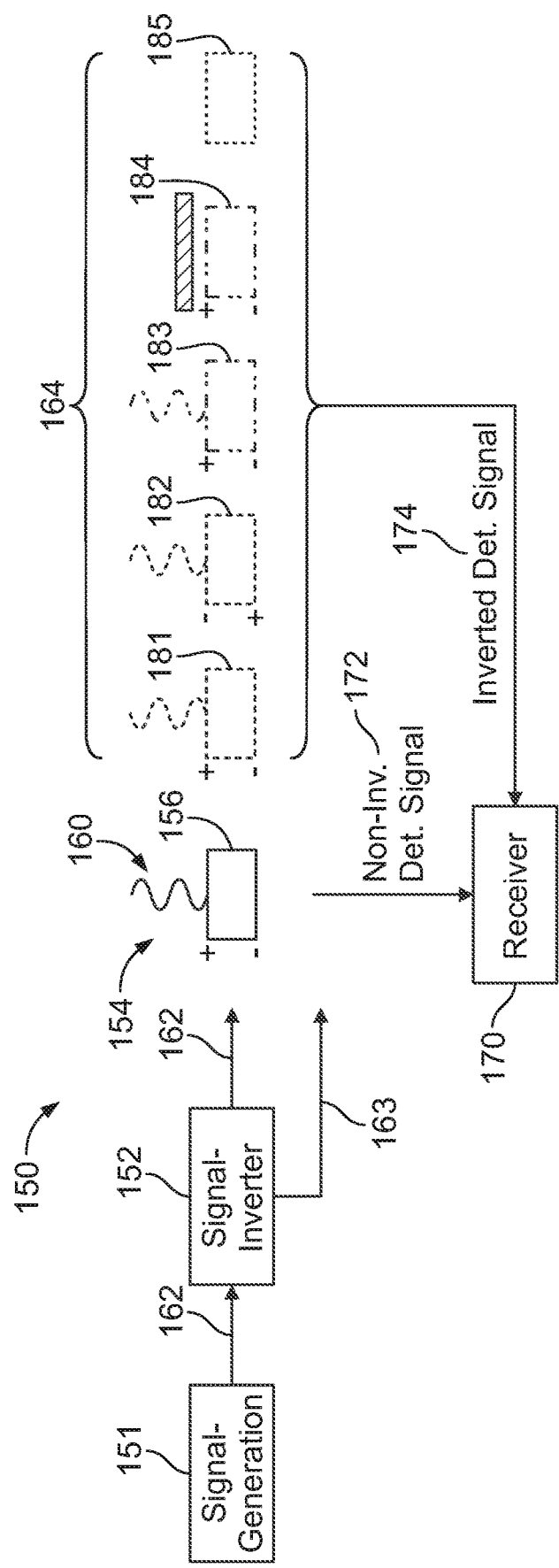
FIG. 2 is a schematic view of a distance-detection system formed in accordance with an embodiment that may be similar or identical to the distance-detection system of FIG. 1.

FIG. 2 is a schematic view of a distance-detection system 150 formed in accordance with an embodiment that may be similar or identical to the distance-detection system 100 (FIG. 1). For example, the distance-detection system 150 includes an ultrasound transducer 154 having an ultrasonic element 156. The distance-detection system 150 also includes a signal-generator 151 and a signal-inversion circuit 152, which may also be referred to as a signal inverter. The signal-generator 151 is configured to provide a drive signal for inducing the ultrasonic element 156. The ultrasonic element 156 generates a pulse of sound waves 160 in response to the drive signal.

As shown in FIG. 2, the drive signal 162 is transmitted through the signal-inversion circuit 152. The signal-inversion circuit 152 is configured to provide an inverted drive signal that may be used to effectively reduce or cancel a reverberation component. For instance, the signal-inversion circuit 152 may be configured to invert the drive signal such that the inverted drive signal is 180° phase-shifted with respect to the non-inverted drive signal. In some embodiments, the signal-inversion circuit 152 may include a drive transformer that effectively inverts the drive signal. The signal-inversion circuit 152 is configured to provide the non-inverted drive signal 162 to the ultrasonic element 156 and the inverted drive signal 163 to a suppression module 164. In other embodiments, the signal-inversion circuit 152 provides the non-inverted drive signal 162 to the suppression module 164 and the inverted drive signal 163 to the ultrasonic element 156. In certain embodiments, the signal-inversion circuit 152 may include a center-tapped inductor. Such embodiments may be particularly suitable for lower frequencies (e.g., less than one megahertz).

As described above, the ultrasonic element 156 communicates a detection signal 172 that is not inverted to the receiver 170. The detection signal 172 includes a drive component, a reverberation component, and a reflected component.

The suppression module 164 is an element that is configured to generate a drive-cancellation signal 174 and communicate the drive-cancellation signal to a receiver 170. As described herein, the term "suppression module" may include a resonant circuit, another active ultrasonic element, or a dummy ultrasonic element. For example, the suppression module 164 may be an ultrasonic element 181 that is driven by the inverted drive signal 163. The suppression module 164 may be an ultrasonic element 182 that is driven by the inverted drive signal 163 and has a polarity that is opposite the polarity of the ultrasonic element 156. The suppression module 164 may be an ultrasonic element 182 that is driven by the non-inverted drive signal 162, but has a polarity that is opposite the polarity of the ultrasonic element 156. The suppression module 164 may be an ultrasonic element 183 that is driven by the non-inverted drive signal 163 and has a polarity that is the same as the polarity of the ultrasonic element 156, but the ultrasonic element 183 is offset such that the ultrasonic element 156 and the ultrasonic element 183 are not planar. As such, the pulse of the ultrasonic element 183 is out-of-phase with respect to the pulse 160 from the ultrasonic element 156. The suppression module 164 may be a dummy ultrasonic element 184 that is driven by the non-inverted drive signal 163, but has an absorber 186 that effectively blocks any pulse from the ultrasonic element 184. In some embodiments, the suppression module 164 may be a resonant circuit 184 that is configured to provide the drive-cancellation signal. The resonant circuit 184 may be responsive to the drive signal or the inverted drive signal.

Optionally, one or more of the suppression modules may be responsive to the inverted drive signal 163 and provide a drive-cancellation signal 174 to the receiver 170.

The drive-cancellation signal is used to offset or suppress the drive component and/or the reverberation component of the detection signal. When the drive component and/or the reverberation component is suppressed, the reflected component may be more easily identified. In particular embodiments, the reflected component may be identified during ring-down or identified as the ultrasonic element responds to the drive signal.

In FIG. 2, the drive-cancellation signal is referred to as an inverted detection signal. In other embodiments, the drive-cancellation signal is a synthetic signal generated by a resonant circuit. Accordingly, the term "drive-cancellation signal" includes both an inverted detection signal and a synthetic signal generated by a resonant circuit.

The receiver 170 is configured to receive the detection signal 172 from the ultrasound transducer 154 or, more specifically, the ultrasonic element 156. The detection signal includes the reverberation component representing reverberation of the ultrasonic element 156 and a reflected component representing reflected sound waves from the interface. The receiver 170 is configured to receive the drive-cancellation signal 174 that is inverted with respect to the reverberation component of the detection signal. The receiver 170 is configured to determine a TOF measurement based on the detection signal 172 in which the reverberation component is offset by the drive-cancellation signal 174.

Figure 3:
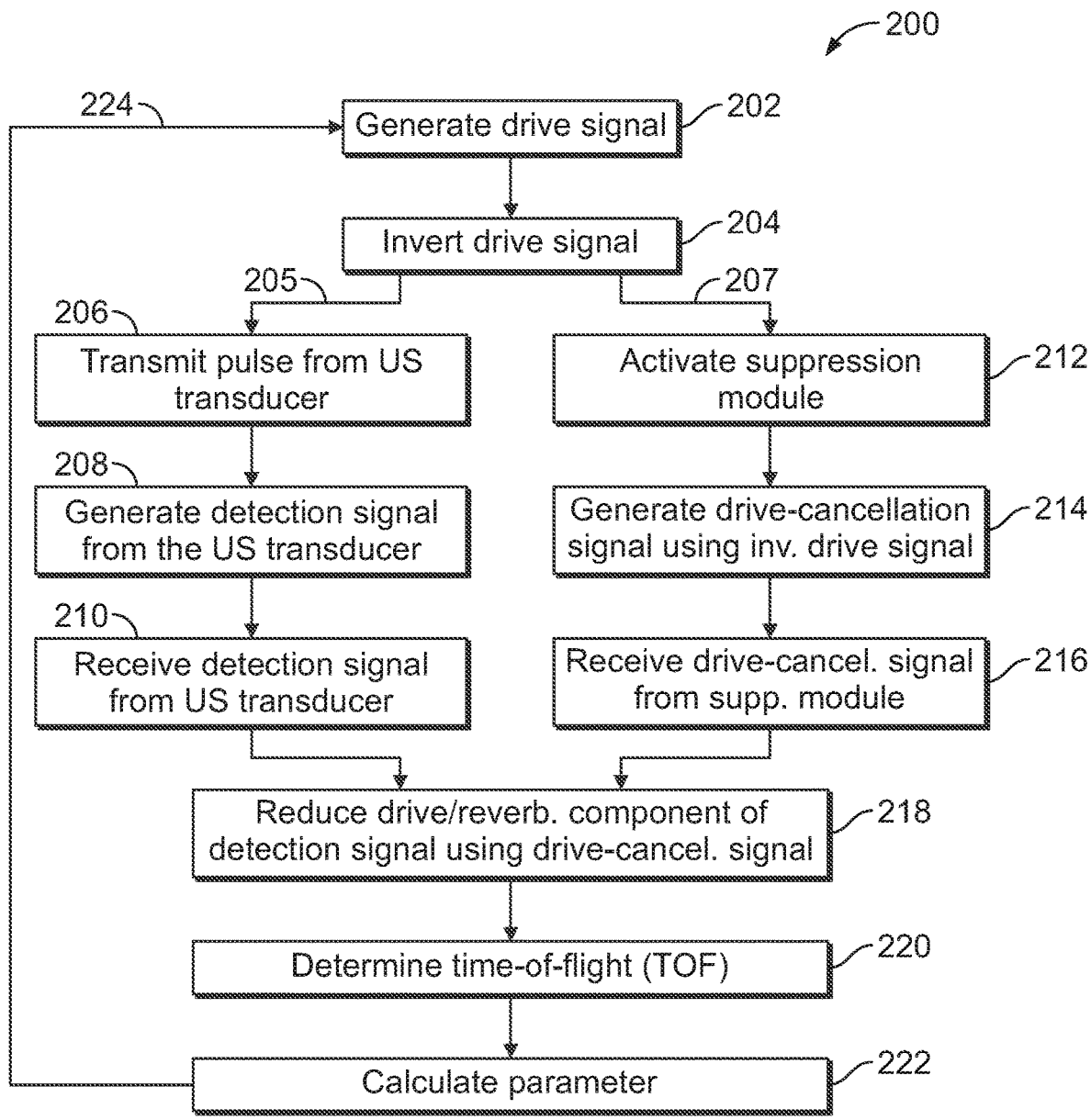
FIG. 3 is a flow-chart illustrating a method formed in accordance with an embodiment.

FIG. 3 is a flow-chart illustrating a method 200 formed in accordance with an embodiment. The method 200 will be described with reference to the distance-detection system 150 (FIG. 2). The method 200 may also be performed by one or more other embodiments, such as the distance-detection systems 400 (FIG. 10), 500 (FIG. 11), 600 (FIGS. 12), and 700 (FIG. 13). The method 200 includes generating, at 202, the drive signal 162 that is configured for activating or exciting the ultrasonic element 156 so that a pulse 160 of sound waves is emitted from the ultrasonic element 156 and directed toward an interface (not shown in FIG. 2). The drive signal 162 may be in the form of an electrical signal. The pulse of sound waves may include a series of sound waves (or cycles of sound waves).

The pulse 160 of sound waves has a designated frequency. For example, the designated frequency may be between 500 Hz and 20 MHz. In particular embodiments, the designated frequency is between 100 kHz and 10 MHz. The pulse 160 also has a cycle number. For example, the pulse 160 may include three (3) cycles or more (e.g., 10 or more cycles). At 204, the drive signal 162 is inverted such that the inverted drive signal 163 is about 180° out-of-phase with respect to the drive signal 162. The drive signal 162 is communicated to the ultrasonic element 156 at 205, and the inverted drive signal 163 is communicated to the suppression module 164 at 207.

At 206, the pulse 160 is transmitted from the ultrasonic element 156. The detection signal 172 is generated at the ultrasonic element 156 and communicated to the receiver 170. At 210, the detection signal is received by the receiver 170. The detection signal may include a drive component, a reverberation component, and a reflected component. For embodiments in which the interface is outside of the dead zone, the reflected component will be separate from the reverberation component and the drive component. However, the reflected component may overlap with the reverberation component and possibly the drive component if the interface is sufficiently near the ultrasonic element 156.

In some embodiments, when the drive signal 162 is provided to the ultrasonic element 156, the inverted drive signal 163 is also provided to the suppression module 164. The inverted drive signal 163 activates the suppression module 164 at 212. At 214, a drive-cancellation signal 174 is generated by the suppression module 164. The drive-cancellation signal 174 is a function of the inverted drive signal 163. The drive-cancellation signal 174 is received by the receiver 170 at 216.

The drive-cancellation signal 174 is approximately out-of-phase with respect to the detection signal 172. In fact, it is unlikely that the drive-cancellation signal 174 is perfectly out-of-phase due to likely non-ideal conditions and features of the interface, the ultrasonic element(s), and the level of the liquid with respect to gravity. As such, the drive-cancellation signal 174 will be substantially out-of-phase with respect to the detection signal 172. The drive-cancellation signal 174 may be used to reduce, at 218, the drive component and the reverberation component.

At 220, a TOF measurement may be determined. The TOF measurement is the difference between a designated start point and a designated stop point. The start point correlates to the pulse transmission from the ultrasound transducer, and the stop point correlates to echo detection by the ultrasound transducer. The TOF measurement may be used to determine a designated parameter. For example, the TOF measurement may indicate a fluid identity, a concentration, or a distance (e.g., fluid level). Using the TOF measurement and the known speed of sound through the designated medium, a distance may be determined at 222. In some embodiments, the parameter is calculated using a programmed algorithm. In other embodiments, the parameter may be identified using, for example, a lookup table (LUT) in which the TOF measurement correlates to a value of the parameter.

As indicated by the return arrow 224, the method 200 may repeat continuously, at designated intervals, or the like. For example, a liquid level may be calculated multiple times every ten seconds.

Figure 4:
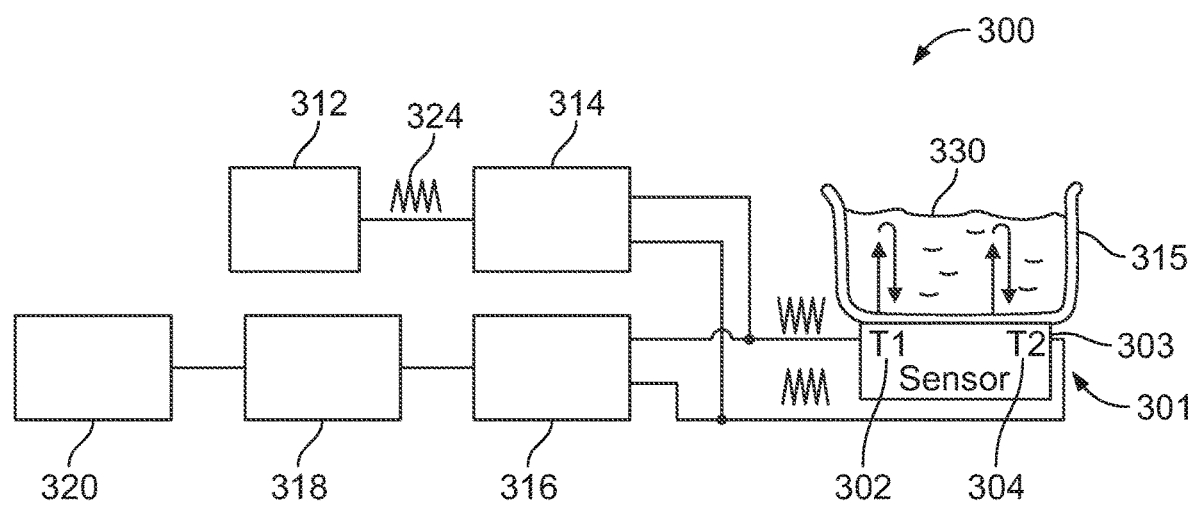
FIG. 4 is a schematic view of a distance-detection system formed in accordance with an embodiment having a first ultrasonic element and a second ultrasonic element operating at inverted drive signals.

FIG. 4 and FIGS. 10-14 illustrate different distance-detection systems. In each case, embodiments may utilize a drive-cancellation signal to reduce a size of the dead zone. FIG. 4 is a schematic view of a distance-detection system 300 formed in accordance with an embodiment. The distance-detection system 300 includes an ultrasound transducer 301 having a first ultrasonic element 302 and a second ultrasonic element 304 operating at different drive signals. The first and second ultrasonic elements 302, 304 of the ultrasound transducer The distance-detection system 300 includes elements that are similar or identical to the elements of the distance-detection system 100 (FIG. 1). For example, the distance-detection system 300 includes a signal-generator 312 and a signal-inverter 314. The distance-detection system 300 also includes a switching circuit 316, a matching circuit 318, and a receiver 320.

As shown, a drive signal 324 is communicated to the signal inverter 314. After inverting the drive signal 324 to provide the inverted drive signal 326, the drive signal 324 and the inverted drive signal 326 are communicated to the respective ultrasonic elements 302, 304.

Each of the ultrasonic elements 302, 304 has a face that is covered by a material layer of a container 315. The ultrasonic dements 302, 304 emit a pulse toward an interface 330. The sound waves of the pulses are reflected back toward the ultrasonic elements 302, 304, which detect the reflected component. Notably, the reflected components detected by the respective ultrasonic elements 302, 304 are substantially out of phase. The detection signal and the drive-cancellation signal are then communicated to a matching circuit and then to the receiver 320.

When two ultrasonic elements are driven in opposite phase, it is generally believed that the signals detected by the respective ultrasonic elements will cancel. However, when the wavelength λ of the pulse is small and separation of the two transducers is sufficiently larger than the wavelength λ, the cancellation takes place only at a very accurate angle setting of the container. The distance between the two ultrasonic elements is small and the critical angle was 0.55 degrees for 3 MHz. This condition is very difficult to satisfy and received signals are not cancelled. A slightly unstable liquid surface and non-ideal setting of the vessel make as if there are no cancellation.

Figure 5:
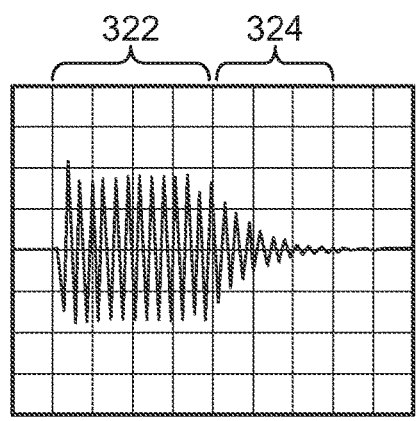
FIG. 5 is a graph illustrating a detection signal that includes a drive component and a reverberation component.
Figure 6:
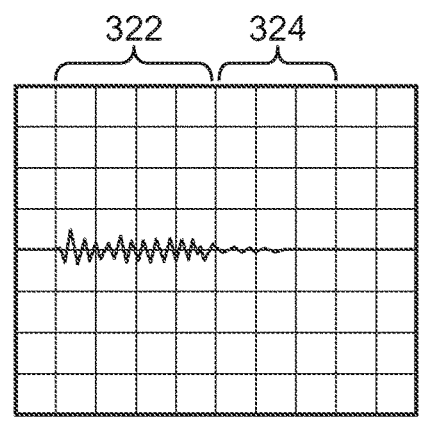
FIG. 6 is a graph illustrating a detection signal after suppressing the drive component and the reverberation component in accordance with an embodiment.

FIG. 5 is a graph illustrating a detection signal (mV/µs) that includes a drive component 322 and a reverberation component 324. As shown, the drive component 322 begins at one microsecond and continues until five microseconds. After the drive signal ceases, the ultrasonic element continues to oscillate, thereby generating a detectable signal that gradually decreases and forms the reverberation component 324. FIG. 6 is a graph illustrating a detection signal after suppressing the drive component 322 and the reverberation component 324 in accordance with an embodiment. As shown, the drive component and the reverberation component have been significantly reduced.

Figure 7:
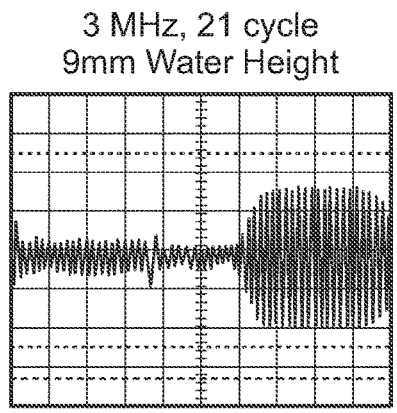
FIG. 7 is a graph illustrating a detection signal having a suppressed drive component and a reflected component when a liquid level is at nine (9) millimeters (mm).
Figure 8:
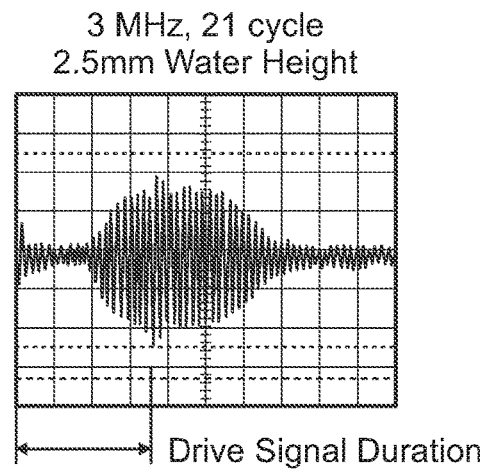
FIG. 8 is a graph illustrating the detection signal having the suppressed drive component and the reflected component when a liquid level is at 2.5 mm.

FIGS. 7 and 8 illustrate detection signals that may be acquired when the liquid is relatively high (9 mm, shown in FIG. 7) and when the liquid is relatively low (2.5 mm). The cycle number for the pulse in FIGS. 7 and 8 is 21 cycles, and the operating frequency is 3 MHz. As shown in FIG. 8, embodiments may be capable of detecting the reflected component as the drive signal is applied to the ultrasonic element and during ring-down.

Figure 9:
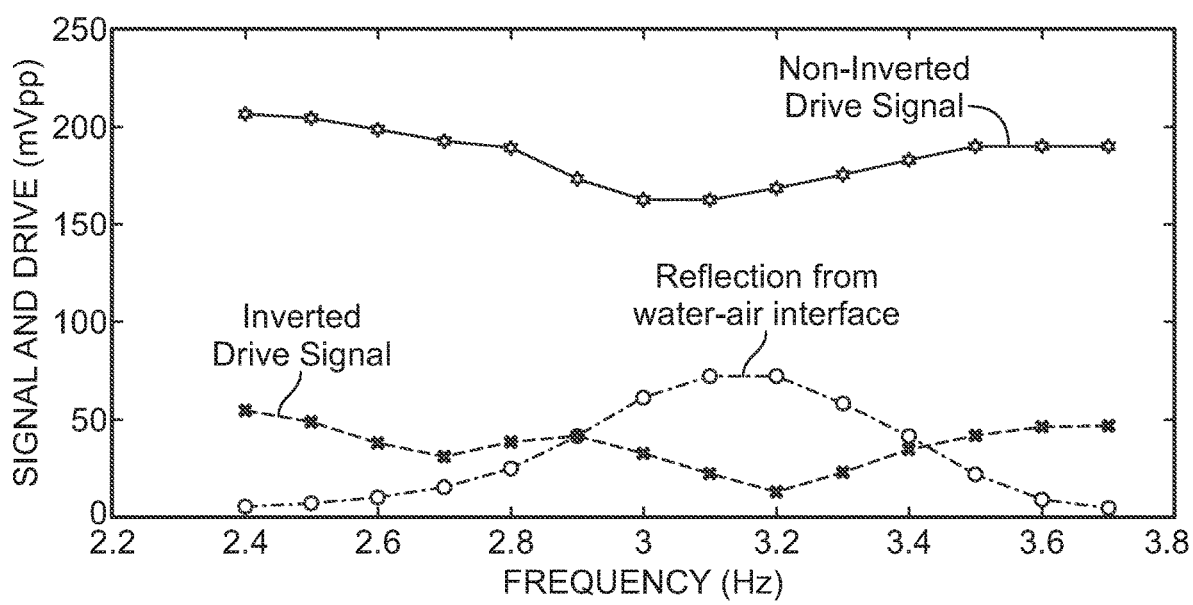
FIG. 9 is a graph illustrating a peak-to-peak voltage for a non-inverted drive signal, the non-inverted drive signal reduced by an inverted drive signal, and a reflected component within a 2.4-3.6 MHz frequency range.

FIG. 9 is a graph illustrating a peak-to-peak voltage (mVpp) across a range of frequencies (2.4-3.6 MHz) for the non-inverted drive signal, the non-inverted drive signal combined with the inverted drive signal, and the reflected component. For frequencies between 2.9 MHz and 3.4 MHz, the mVpp for the reflected component is greater than the non-inverted drive signal reduced by the inverted drive signal.

Figure 10:
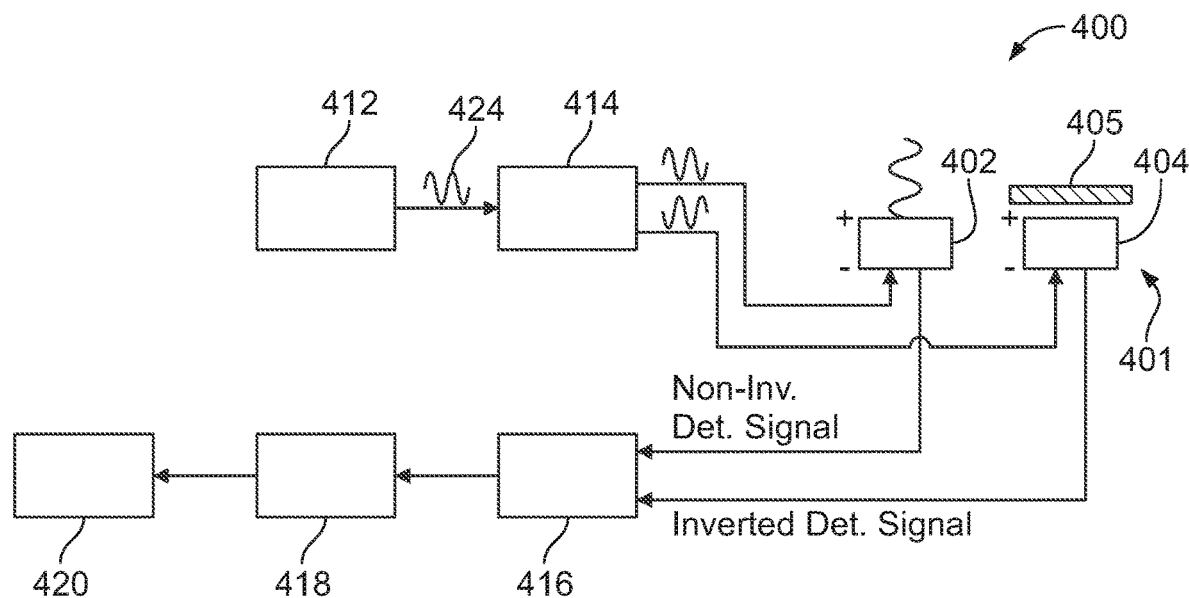
FIG. 10 is a schematic view of a distance-detection system formed in accordance with an embodiment having an ultrasonic element and a dummy ultrasonic element operating at inverted drive signals.

FIG. 10 is a schematic view of a distance-detection system 400 formed in accordance with an embodiment. The distance-detection system 400 includes elements that are similar or identical to the elements of the distance-detection system 100 (FIG. 1). For example, the distance-detection system 400 includes a signal-generator 412 and a signal-inverter 414. The distance-detection system 400 also includes a switching circuit 426, a matching circuit 418, and a receiver 420.

The distance-detection system 400 also includes an ultrasound transducer 401 having an ultrasonic element 402 and a dummy ultrasonic element 404. To distinguish the two, the ultrasonic element 402 (FIG. 4) may be referred to as an "active ultrasonic element" or the dummy ultrasonic element 404 may be referred to as a "dummy element." Unlike the ultrasonic element 304, the dummy ultrasonic element 404 does not detect and communicate a reflected component. Instead, the dummy ultrasonic element 404 generates an electrical signal in response to oscillations caused by the drive signal and subsequent reverberation.

In the illustrated embodiment, the ultrasonic element 402 and the dummy ultrasonic element 404 are driven by out-of-phase drive signals. The ultrasonic element 402 is configured to transmit a pulse of sound waves and detect a reflected component from the pulse of sound waves. The dummy ultrasonic element 404, however, is positioned such that a pulse is not transmittable into the medium and, as such, a reflected component cannot be detected by the dummy ultrasonic element 404. For example, the ultrasound transducer 401 may include an absorber 415 that absorbs any sound waves generated by the dummy ultrasonic element 404. Nonetheless, the dummy ultrasonic element 404 is driven by the inverted drive signal, thereby causing the dummy ultrasonic element 404 to oscillate. The dummy ultrasonic element 404 generates an electrical signal in response to the oscillations of the dummy ultrasonic element 404.

Accordingly, only the ultrasonic element 402 emits a pulse toward the interface. The sound waves of the pulse are reflected back toward the ultrasonic element 402, which detects the reflected component. The reflected component is not out-of-phase with any reflected component of the dummy ultrasonic element because this reflected component does not exist. Nevertheless, the dummy ultrasonic element 404 provides an inverted detection signal to the receiver 420 that includes an inverted drive component and an inverted reverberation component. Accordingly, the dummy ultrasonic element 404 provides an inverted detection signal that is used to reduce the drive component and the reverberation component without reducing the reflected component of the detection signal from the ultrasonic element 402.

Figure 11:
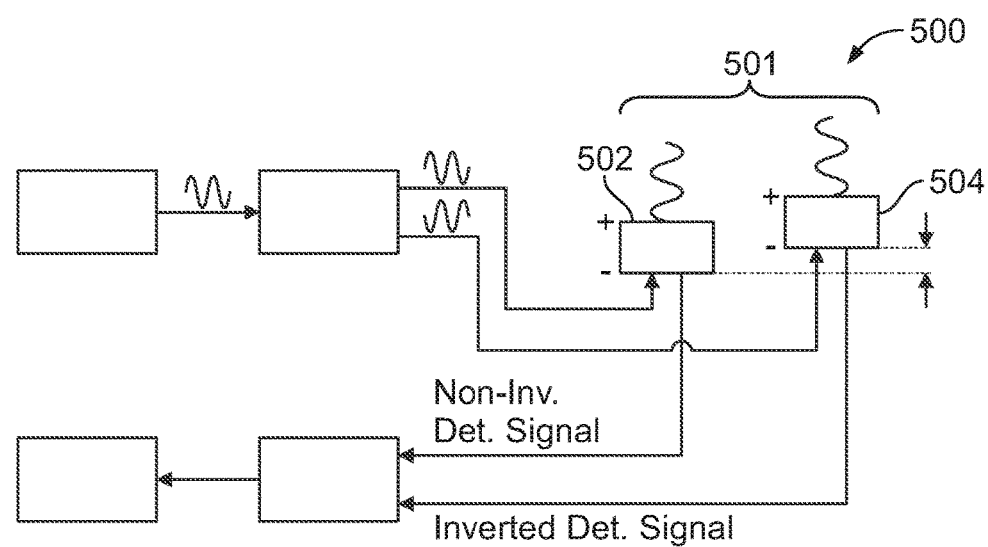
FIG. 11 is a schematic view of a distance-detection system formed in accordance with an embodiment having a first ultrasonic element and a second ultrasonic element that are displaced and operating at inverted drive signals.

FIG. 11 is a schematic view of a distance-detection system 500 formed in accordance with an embodiment. The distance-detection system 500 has a first ultrasonic element 502 and a second ultrasonic element 504 that are displaced with respect to one another such that one of the ultrasonic elements is positioned a half-wavelength in front of the other ultrasonic element. The first and second ultrasonic elements 502, 504 are configured to be driven by a non-inverted drive signal and an inverted drive signal. The distance-detection system 500 may have elements that are similar or identical to the elements of the distance-detection system 500.

As shown in FIG. 11, the first ultrasonic element 502 and the second ultrasonic element 504 are offset with respect to one another. As such, any reflected components detected at the first ultrasonic element 502 and the second ultrasonic element 504 are not cancelled. More specifically, the ultrasonic element 504 is positioned half-wavelength in front of the ultrasonic element 502 so that the reflected components are not cancelled at the front axis. Nonetheless, the drive component and the reverberation component of the inverted drive signal are out-of-phase with the drive component and the reverberation component of the non-inverted drive signal. As such, the drive component and the reverberation component of the inverted drive signal are used to reduce the drive component and the reverberation component of the non-inverted drive signal. The reflected components, however, are not out-of-phase.

Figure 12:
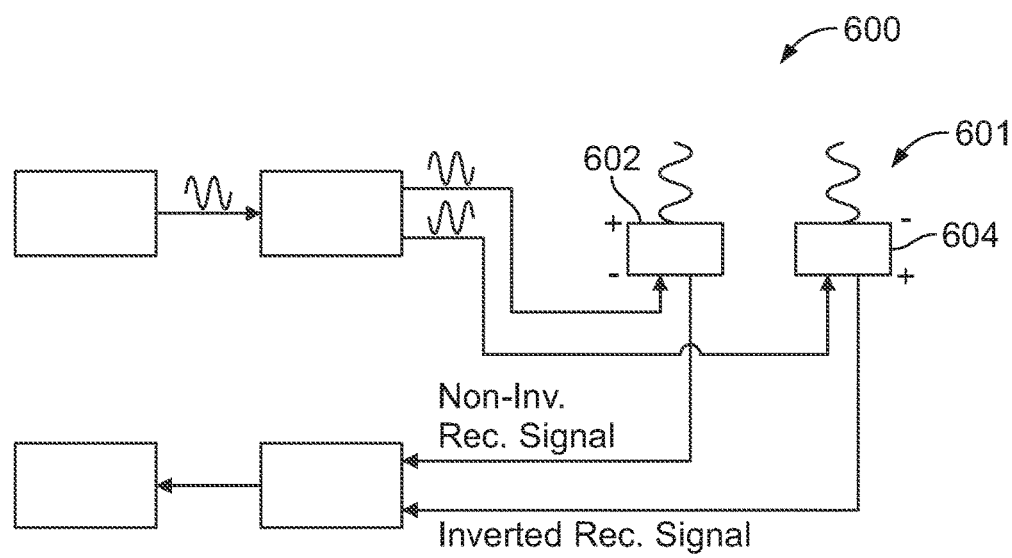
FIG. 12 is a schematic view of a distance-detection system formed in accordance with an embodiment having a first ultrasonic element and a second ultrasonic element that have opposite polarities and are operating at inverted drive signals.
Figure 13:
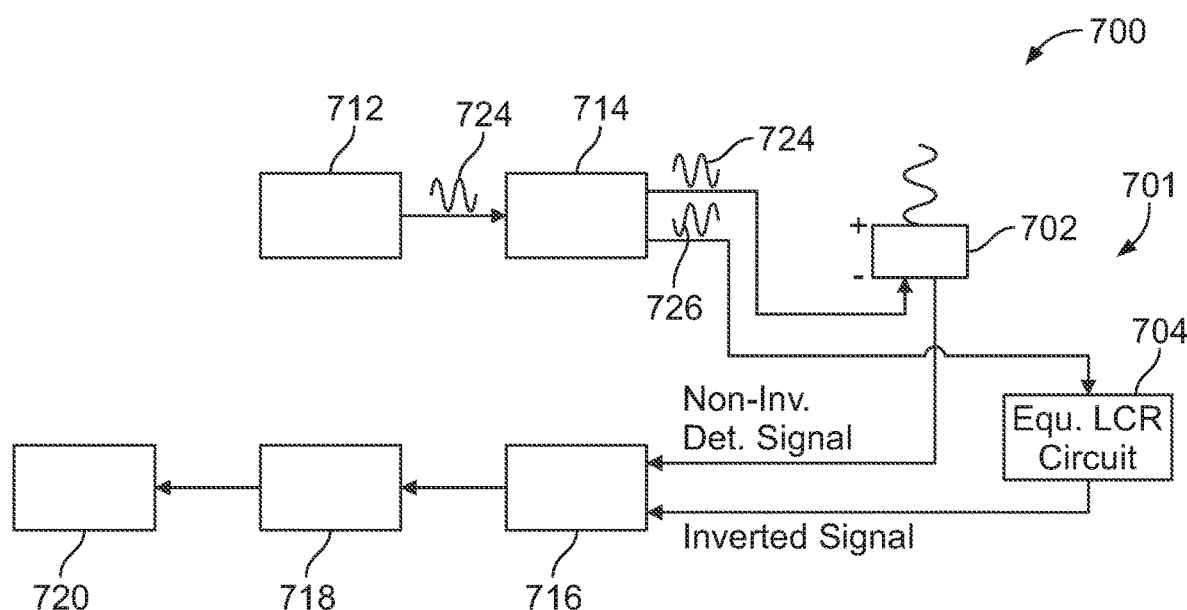
FIG. 13 is a schematic view of a distance-detection system formed in accordance with an embodiment having an ultrasonic element and an equivalent resonant circuit that provides an inverted drive signal.

FIG. 12 is a schematic view of a distance-detection system 600 formed in accordance with an embodiment having a first ultrasonic element 602 and a second ultrasonic element 604 that have opposite polarities (as indicated by the +/− and −/+). The first ultrasonic element 602 and the second ultrasonic element 602, 604 are driven by a non-inverted drive signal and an inverted drive signal, respectively. The distance-detection system 600 includes an ultrasound transducer 601 having the first ultrasonic element 602 and the second ultrasonic element 604. Because the first and second ultrasonic elements 602, 604 have opposite polarities, the out-of-phase drive signals cause the first and second ultrasonic elements 602, 604 to move in-phase. Nonetheless, the detection signals provided by the first and second ultrasonic elements 602, 604 with respect to the drive and reverberations components are out-of-phase and can be used to reduce the drive and reverberations components.

FIG. 13 is a schematic view of a distance-detection system 700 formed in accordance with an embodiment. The distance-detection system 700 includes an ultrasound transducer 701 having the ultrasonic element 702 and an equivalent resonant circuit 704. The distance-detection system 700 may also include elements that are similar or identical to the elements of the distance-detection system 100 (FIG. 1). For example, the distance-detection system 700 includes a signal-generator 712 and a signal-inverter 714. The distance-detection system 700 also includes a switching circuit 716, a matching circuit 718, and a receiver 720.

As shown, a drive signal 724 is communicated to the signal inverter 714. After generating the inverted drive signal 726, the drive signal 724 and the inverted drive signal 726 are communicated to the ultrasonic element 702 and the equivalent resonant circuit 704, respectively. Similar to the above embodiments, the ultrasonic element 702 is configured to provide a detection signal that includes a drive component, a reverberation component, and a reflection component. The equivalent resonant circuit 704 is configured to receive the inverted drive signal 726 and generate an inverted detection signal that is used to reduce the drive and reverberated components.

Figure 14A:
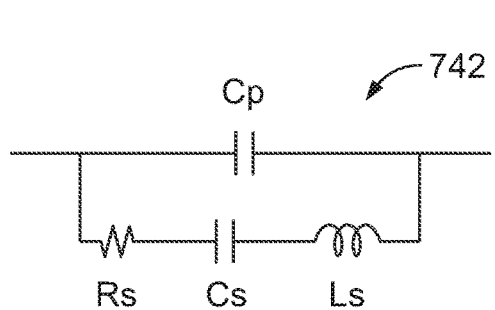
FIG. 14A is a circuit diagram of an equivalent resonant circuit that may be used with the distance-detection system of FIG. 13.
Figure 14B:
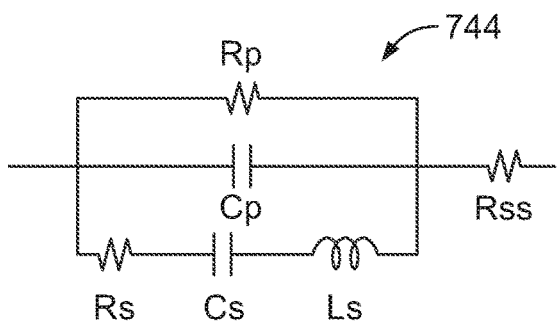
FIG. 14B is also a circuit diagram of an equivalent resonant circuit that may be used with the distance-detection system of FIG. 13.

FIGS. 14A and 14B are circuit diagrams of equivalent resonant circuits 742, 744, respectively, that may be used with the distance-detection system 700 (FIG. 13). The resonant circuit 742 is a pure piezoelectric resonator equivalent circuit in which air is at a front and back of the ultrasonic element. At a low frequency $f \ll f_0$, the measured capacitance $C \approx Cs+Cp$ and at a high frequency $f \gg f_0$, the measured capacitance is $C \approx Cs$. At resonance $f_0$, the measured resistance $R \approx Rs$. When front and back material are plastic/water and absorber, other resistances may be added.

Figure 15:
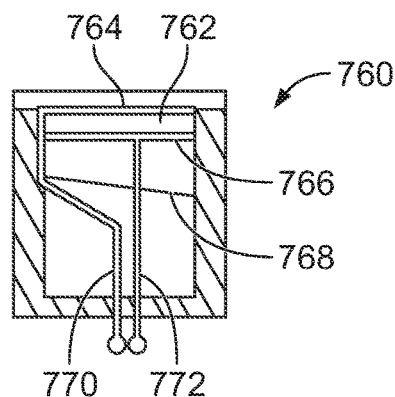
FIG. 15 is a schematic cross-section of a piezoelectric ultrasonic element that may be used by one or more embodiments.
Figure 16:
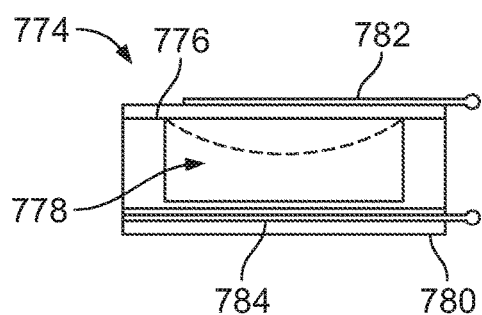
FIG. 16 is a schematic cross-section of a capacitive micromachined ultrasonic transducer (CMUT) element that may be used by one or more embodiments.
Figure 17:
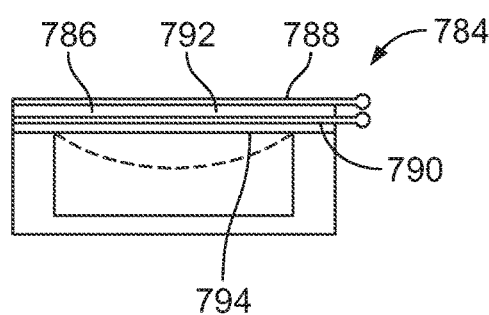
FIG. 17 is a schematic cross-section of a piezoelectric micromachined ultrasonic transducer (PMUT) element that may be used by one or more embodiments.

FIGS. 15-17 illustrate elements that alone may form an ultrasonic element as described herein or may form a portion of an ultrasonic element as described herein. More specifically, FIG. 15 is a schematic cross-section of a piezoelectric ultrasonic element 760 that may be used by one or more embodiments. The element 760 includes piezoelectric material 762 sandwiched between high conductivity electrode layers 764, 766, which may comprise, for example, gold or platinum. The electrode layer 766 is supported by a backing layer 768. The electrode layers 764, 766 are electrically coupled to conductors 770, 772, respectively.

FIG. 16 is a schematic cross-section of a capacitive micromachined ultrasonic transducer (CMUT) element 774 that may be used by one or more embodiments. As shown, the CMUT element 774 includes a metallized suspended membrane 776 (e.g., silicon nitride ($Si_xN_y$)) that is disposed over a cavity 778. The CMUT element 774 also includes rigid substrate 780. When a DC voltage is applied between two electrodes 782, 784, the membrane 776 is deflected, being attracted toward the substrate by electrostatic forces. The mechanical restoring force caused by the stiffness of the membrane 776 resists the attraction. Consequently, ultrasound can be generated from the oscillations of the membrane 776 with an AC voltage input.

FIG. 17 is a schematic cross-section of a piezoelectric micromachined ultrasonic transducer (PMUT) element 784 that may be used by one or more embodiments. The PMUT element 784 that includes a membrane 786 sandwiching between electrode layers 788, 790. Deflection of the membrane 786 in the PMUT element 784 is caused by lateral strain generated from the piezoelectric effect of the membrane 786. The membrane 786 includes at least one piezoelectric layer 792 and a passive elastic layer 794. In operation, the resonant frequency of the PMUT does not directly depend on the thickness of the piezoelectric layer 792. Instead, the flexural mode resonant frequencies are closely related to the shape, dimensions, boundary conditions, intrinsic stress and mechanical stiffness of membrane.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The patentable scope should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112(f), unless and until such claim limitations expressly use the phrase "means for" followed by a statement of function void of further structure.

What is claimed is:

1. A distance-detection system comprising:
a signal-generator configured to provide a drive signal;
an ultrasound transducer having at least one ultrasonic element, the ultrasound transducer being configured to transmit a pulse of sound waves in response to the drive signal, the pulse being directed toward an interface, the ultrasound transducer configured to detect reflected sound waves; and
a receiver configured to receive a detection signal from the ultrasound transducer, the detection signal including a reverberation component representing reverberation of the ultrasound transducer and a reflected component representing reflected sound waves from the interface;
wherein the receiver is configured to receive a drive-cancellation signal that is inverted with respect to the reverberation component of the detection signal and wherein the receiver is configured to determine a time-of-flight measurement based on the detection signal in which the reverberation component of the detection signal is reduced by the drive-cancellation signal.

2. The distance-detection system of claim 1, further comprising a signal inverter that is configured to generate an inverted drive signal based on the drive signal, wherein the drive-cancellation signal is generated by a suppression module that is fed the inverted drive signal.

3. The distance-detection system of claim 1, wherein the receiver is configured to receive the detection signal as the pulse is transmitted toward the interface and determine the time-of-flight measurement of the reflected component that was received as the pulse was transmitted.

4. The distance-detection system of claim 1, further comprising a switching circuit that is configured to switch between a transmit mode and a receive mode, the detection signal being received during the receive mode, the receive mode occurring without a dead zone.

5. The distance-detection system of claim 1, wherein the ultrasound transducer includes a first ultrasonic element, the pulse is a first pulse, and the detection signal is a first detection signal, the distance-detection system further comprising:
a second ultrasonic element for directing a second pulse of sound waves toward the interface, the second pulse being transmitted in response to receiving an inverted drive signal;
wherein the receiver is configured to receive a second detection signal from the second ultrasonic element, the second detection signal including the drive-cancellation signal.

6. The distance-detection system of claim 1, wherein the ultrasound transducer includes a first ultrasonic element, the pulse is a first pulse, and the detection signal is a first detection signal, the distance-detection system further comprising:
a second ultrasonic element for directing a second pulse of sound waves toward the interface in response to the drive signal, wherein the first and second ultrasonic elements have opposite polarities;
wherein the receiver is configured to receive a second detection signal from the ultrasound transducer, the second detection signal including the drive-cancellation signal.

7. The distance-detection system of claim 1, wherein the ultrasound transducer includes a first ultrasonic element, the pulse is a first pulse, and the detection signal is a first detection signal, the distance-detection system further comprising:
a second ultrasonic element for directing a second pulse of sound waves toward the interface, wherein the signal-generator is configured to provide an inverted drive signal to the second ultrasonic element, wherein the first and second ultrasonic elements have opposite polarities;
receiving a second detection signal from the ultrasound transducer, the second detection signal including the drive-cancellation signal.

8. The distance-detection system of claim 1, wherein the detection signal is a first detection signal, the distance-detection system further comprising:
a dummy ultrasonic element configured to receive an inverted drive signal from the signal-generator, wherein the receiver is configured to receive a second detection signal from the dummy ultrasound transducer, the second detection signal including the drive-cancellation signal.

9. The distance-detection system of claim 1, further comprising a resonant circuit configured to provide the drive-cancellation signal.

10. The distance-detection system of claim 1, wherein a resonant frequency of the at least one ultrasonic element is between 100 kHz and 10 MHz and the number of cycles in the pulse includes at least 3 cycles.

11. A method comprising:
   providing a drive signal to an ultrasound transducer for transmitting a pulse of sound waves toward an interface;
   receiving a detection signal from the ultrasound transducer, the detection signal including a reverberation component representing reverberation of the ultrasound transducer and a reflected component representing reflected sound waves from the interface;
   receiving a drive-cancellation signal that is inverted with respect to the reverberation component of the detection signal; and
   determining a time-of-flight measurement based on the detection signal in which the reverberation component is reduced by the drive-cancellation signal.

12. The method of claim 11, further comprising inverting the drive signal to form an inverted drive signal, wherein the drive-cancellation signal is generated by a suppression module that is fed the inverted drive signal.

13. The method of claim 11, wherein receiving the detection signal includes receiving the reflected component as the pulse is transmitted toward the interface and determining the time-of-flight measurement of the reflected component that was received as the pulse was transmitted.

14. The method of claim 11, further comprising switching between a transmit mode and a receive mode, the detection signal being received during the receive mode, the receive mode occurring without a dead zone.

15. The method of claim 11, wherein the ultrasound transducer includes a first ultrasonic element, the pulse is a first pulse, and the detection signal is a first detection signal, the method further comprising:
   providing an inverted drive signal to a second ultrasonic element for directing a second pulse of sound waves toward the interface;
   receiving a second detection signal from the ultrasound transducer, the second detection signal including the drive-cancellation signal.

16. The method of claim 11, wherein the ultrasound transducer is a first ultrasonic element, the pulse is a first pulse, and the detection signal is a first detection signal, the method further comprising:
   providing a drive signal to a second ultrasonic element for directing a second pulse of sound waves toward the interface, wherein the first and second ultrasonic elements have opposite polarities;
   receiving a second detection signal from the ultrasound transducer, the second detection signal including the drive-cancellation signal.

17. The method of claim 11, wherein the ultrasound transducer includes a first ultrasonic element, the pulse is a first pulse, and the detection signal is a first detection signal, the method further comprising:
   providing an inverted drive signal to a second ultrasonic element for directing a second pulse of sound waves toward the interface, wherein the first and second ultrasonic elements have opposite polarities;
   receiving a second detection signal from the ultrasound transducer, the second detection signal including the drive-cancellation signal.

18. The method of claim 11, wherein the detection signal is a first detection signal, the method further comprising:
   providing an inverted drive signal to excite a dummy ultrasonic element;
   receiving a second detection signal from the dummy ultrasound transducer, the second detection signal including the drive-cancellation signal.

19. The method of claim 11, further comprising a resonant circuit configured to provide the drive-cancellation signal.

20. The method of claim 11, wherein the resonant frequency of the ultrasound transducer is between 100 kHz and 10 MHz and the number of cycles in the pulse includes at least 3 cycles.

* * * * *